United States Patent [19]
Yi

[11] Patent Number: 5,751,685
[45] Date of Patent: May 12, 1998

[54] PROBE FOR MEMORY DEVICE HAVING MOVABLE MEDIA

[75] Inventor: You-Wen Yi, Yokohama, Japan

[73] Assignee: Hewlett-Packard Company, Palo Alto, Calif.

[21] Appl. No.: 644,385

[22] Filed: May 10, 1996

[30] Foreign Application Priority Data

May 30, 1995 [JP] Japan ................................. 7/155222

[51] Int. Cl.$^6$ .................................................. G11B 7/00
[52] U.S. Cl. .................................................. 369/126; 250/306
[58] Field of Search ........................... 369/126, 59, 124; 250/306, 307

[56] References Cited

U.S. PATENT DOCUMENTS

| | | | |
|---|---|---|---|
| 5,086,409 | 2/1992 | Oda et al. | 365/10 |
| 5,418,363 | 5/1995 | Elings et al. | 250/306 |
| 5,461,605 | 10/1995 | Takimoto et al. | 369/126 |
| 5,506,829 | 4/1996 | Yagi et al. | 369/126 |
| 5,526,334 | 6/1996 | Yamano et al. | 369/126 X |
| 5,546,374 | 8/1996 | Kuroda et al. | 369/126 |

OTHER PUBLICATIONS

Tamanuki, Takemasa et al., "Temperature Characteristics of Short–Cavity AlGaAs/GaAs Surface Emitting Lasers", IEICE Transactions, vol. E 74, No. 11, pp. 3867–3869.

*Primary Examiner*—Muhammad N. Edun

[57] ABSTRACT

A buffered probing device includes a cantilever-shaped probe having a micro-needle at its tip, and an electric circuit that applies electrical signals between the micro-needle and a probe target to which an electrical stimulus is applied. In one embodiment of the invention, the probe includes a suspension member having a spring constant per unit length that is less than that of a probe body. The micro-needle is formed on the suspension member. In another embodiment of the invention, the electric circuit applies oscillations at a specific frequency to the probe, such that the micro-needle is always or intermittently in contact with the surface of the probe target. As a result, wear of the needle is greatly reduced.

6 Claims, 7 Drawing Sheets

PROBE FOR MEMORY DEVICE HAVING MOVABLE MEDIA

BACKGROUND OF THE INVENTION

1. Technical Field

The invention relates to a probe that is a suitable read/write mechanism for a memory device having movable media. In particular, the invention relates to a probing device capable of eliminating or significantly reducing the damage and wear caused by a micro-needle due to contact of the micro-needle at the tip of the probe with the surface of the probe target.

2. Description of the Prior Art

It is known in memory devices that have movable media to detect the distance between a micro-needle at a probe tip and the recording medium, and to maintain this distance at a constant level. See, for example Sliwa, U. S. Pat. No. 5,216,631; and Japanese Unexamined Patent Application No. 4-289580.

In Sliwa's control technology, a complex feedback circuit is required to maintain a distance of several angstroms (Å) between the micro-needle and the recording medium. Detecting the distance between the micro-needle at the tip of the probe and the recording medium is extremely difficult, particularly when the recording medium is not a semiconductor.

Usually, reducing the distance between the micro-needle at the tip of the probe and the recording medium as much as possible is effective to increase the recording density. If only this aspect is focused on, contact between the micro-needle and the recording medium is preferred. However, touching the micro-needle to the recording medium wears out both the micro-needle and the recording medium. The wear of the micro-needle is a particularly serious problem. When satisfactory needle life is not obtained, the problem of a shorter life for the memory device arises.

One approach to solving the above problems involves the use of a probe technology in which the micro-needle touches the recording medium with an extremely small force (see, for example Japanese Unexamined Patent No. 6-270297). During the period in which the micro-needle is in contact with the recording medium, the contact force is controlled so that it does not exceed the binding force between the atoms in the micro-needle material. Specifically, the contact force is maintained within several nN. Such technique also detects the distance between the micro-needle at the tip of the probe and the recording medium, and thereby extends the wear life of the micro-needle without requiring a complex feedback circuit.

It would be particularly desirable to provide a memory device that markedly improves the wear life of the micro-needle.

SUMMARY OF THE INVENTION

The invention provides a probing device capable of eliminating or dramatically reducing damage and wear to the micro-needle that is caused by contact between the micro-needle at the probe tip and the surface of the probe target. Thus, the invention is especially useful as a probe that is suited as the read/write mechanism for a memory device having movable media.

The probe structure is formed from a probe that has a cantilever shape, and that includes a micro-needle on its tip and an electric circuit. In one embodiment of the invention, a suspension member having a spring constant per unit length that is smaller than that of the body of the probe is formed at the tip of the probe, and a micro-needle is formed in the suspension member. In another embodiment of the invention, the electric circuit applies oscillations at a specific frequency to the probe, so that the micro-needle is always or intermittently in contact with the surface of the probe target, such that the wear of the needle is greatly reduced.

DETAILED DESCRIPTION OF THE INVENTION

The invention provides a probing device that can significantly reduce the wear of the micro-needle caused by contact between the micro-needle on the probe tip and the surface of the probe target. The invention also provides a memory device having movable media that uses the probing device as the read/write mechanism.

The wear of the micro-needle can be reduced by decreasing:

external force applied by the probe; and adsorption force and friction force of the micro-needle and substrate.

For example, in atomic force microscope (AFM) technology, when a probe having a small spring constant and a needle having a small radius of curvature at the tip of the micro-needle are used, the external force applied by the probe, and the adsorption force and friction force of the micro-needle and substrate all decrease. Accordingly, the wear of the micro-needle is significantly reduced.

The invention focuses on the large dependence of the wear of the micro-needle, on the effective inertial force (or the effective weight added to the micro-needle) of the probe and the micro-needle, regardless of the external force applied by the probe, and on the adsorption force and friction force of the micro-needle and substrate. Thus, if the micro-needle and the probe are connected via a material that has a spring constant per unit length that is smaller than that of the probe body, the effective inertial force of the probe is decreased and the wear of the micro-needle is reduced.

The inertial force is thought to be proportional to the square of the probe scanning speed in the horizontal direction. Therefore, when the needle scans at a high speed, the micro-needle collides with the probe target (sample) and the possibility of wear increases. In an AFM, the scanning speed is several μm/sec at the most. In a memory device having movable media, scanning at a speed higher than that of an AFM is preferred, but the wear of the micro-needle becomes the barrier, and a satisfactory scanning speed is not obtained. However, the inventors herein have found that if the effective inertial force of the micro-needle can be reduced as described above, the scanning speed can be significantly increased.

In a probe device having an electric circuit that applies electrical signals between the micro-needle and the probe target (for example, the probe in a memory device having movable media), the micro-needle at the probe tip does not always need to be in contact with the media or at a constant contact force. In particular, in a memory device having a movable media, the probe moves at a constant speed with respect to the recording medium. Further, the 1-bit memory cells that are recorded on the surface of the recording medium are formed at a constant pitch on the surface of the recording medium.

Consequently, for the electric circuit to read or write data, the micro-needle only needs to access the memory medium periodically.

In view of the above, the inventors herein have also discovered that if oscillations at a specific frequency are applied to the probe, so that the micro-needle is always or intermittently in contact with the surface of the probe target, then the wear of the needle is greatly reduced.

Moreover, high-speed relative motion between the micro-needle and the recording medium is possible, particularly, in a memory device having movable media. In such embodiment of the invention, the oscillation period of the probe can be synchronized to the access period for the memory medium by the micro-needle.

The probing device comprises a cantilever-shaped probe having a micro-needle at its tip and an electric circuit that applies electrical signals between the micro-needle and the probe target (specifically, some electrical stimulus is applied to the probe target). A suspension with a spring constant per unit length that is less than that of the probe body is provided, and the micro-needle is formed on the suspension member (hereinafter, the probing device is referred to as a buffered probing device).

In the buffered probing device, a plate that is thinner than the probe body is used as the suspension member. Because the spring constant is proportional to the cube of its thickness, the spring constant can be easily lowered. For example, a plate that is thinner than the probe body can be folded to provide the suspension member (as discussed in greater detail below). Further, the suspension member is not limited to a plate configuration. For example, a frame shape or a bar shape can also be used for the suspension member. The suspension member is usually formed of the same material as that of the probe body.

A circuit (i.e. a probe control circuit) for controlling the distance between the micro-needle and the probe target can be installed in the buffered probing device. Such distance control can be accomplished by the use of electrostatic force or piezoelectric force. When such distance is controlled by electrostatic force, a first electrode can be installed in the probe, and a second electrode can be installed on at least the substrate holding the probe or the substrate on the side where the probe target is located.

The probing device is further comprised of a cantilever-shaped probe having a micro-needle formed on its tip, an electric circuit that applies electrical signals between the micro-needle and the probe target, and an excitation control circuit that applies oscillations at a specified frequency to the probe (hereinafter referred to as an excited probing device).

Periodic oscillation of the probe can be generated by electrostatic force or by piezoelectric force. To generate the oscillation by electrostatic force, a first electrode and a second electrode are used as described above in connection with the buffered probing circuit. The electrostatic force is periodically generated between the first and second electrodes by the excitation control circuit (usually located in the probe control circuit), and oscillations at a specific frequency are applied to the probe.

The probing device may also be provided as a combination of the buffered probing device and the excited probing device (hereinafter referred to as a buffered/excited probing device). The buffered/excited probing device is comprised of a cantilever-shaped probe that has a micro-needle in its tip, an electric circuit that applies electrical signals between the micro-needle and the probe target, a suspension in which the spring constant per unit length is less than that of the probe body, where the micro-needle formed in the suspension, and an excitation control circuit that applies oscillations at a specific frequency to the probe.

A probe scanning mechanism can be included in the buffered, excited, and buffered/excited probing devices described above to move the probe and the probe target relative to each other along the surface of the probe target.

In the buffered probing device, the probe control circuit usually moves the micro-needle relative to the probe target while the micro-needle is in contact with the probe target. Because the effective mass of the probe tip is small, wear of the micro-needle is eliminated or decreased, even when the micro-needle collides with undulations on the surface of the probe target.

When the micro-needle is moved relative to the probe target while the micro-needle is not in contact with the target, the micro-needle still collides with the undulations on the surface of the probe target. Wear on the micro-needle is nonetheless eliminated or reduced by the invention.

A probe control circuit in an excited probing device or a buffered/excited probing device:

can apply oscillations to the probe when the micro-needle is in contact with the probe target; and can apply oscillations to the probe so that it is repeatedly in contact and not in contact with the probe target at a specified frequency.

The advantages of applying oscillations to the probe when the micro-needle is in contact with the probe target include;

(1) the ability to lower the average of the contact force between the micro-needle and the probe target;

(2) the ability to decrease the wear force between the micro-needle and the undulations on the surface of the probe target that accompanies contact between the micro-needle and the probe target; and (3) the ease of inserting adsorption molecules between the micro-needle and the surface of the probe target when an adsorption layer for water is in the probe target surface to improve its effect as the lubricant in the adsorption layer.

Applying oscillations to the probe so that it is repeatedly in contact and not in contact with the probe target at a specified frequency avoids micro-needle wear while the micro-needle is separated from the probe target. Consequently, the life of the probing device can be significantly extended.

The electrical signals (i.e. electrical stimulus applied to the probe target) that are applied between the micro-needle and the probe target in the excited probing device or the buffered/excited probing device may or may not be synchronized to the probe oscillations. When applying oscillations to the probe so that it is repeatedly in contact and not in contact with the probe target at a specified frequency, the contact needle and the probe target are separated. As the separation between the two increases, the micro-needle cannot always apply the electrical stimulus to the probe target. In this case, the timing at which the electrical stimulus is applied must be synchronized to the timing at which the micro-needle gets close to or touches the probe target.

Buffered and excited probing devices, or a buffered/excited probing device can be used to measure the surface of the probe target. By including a scanning mechanism in each probing device, the invention is readily applied to the read/write mechanism for a memory device having movable media. In this case, a recording medium that can read and write data is used as the probe target, and the data read or write signals are used as the electrical signals.

Figure 1:
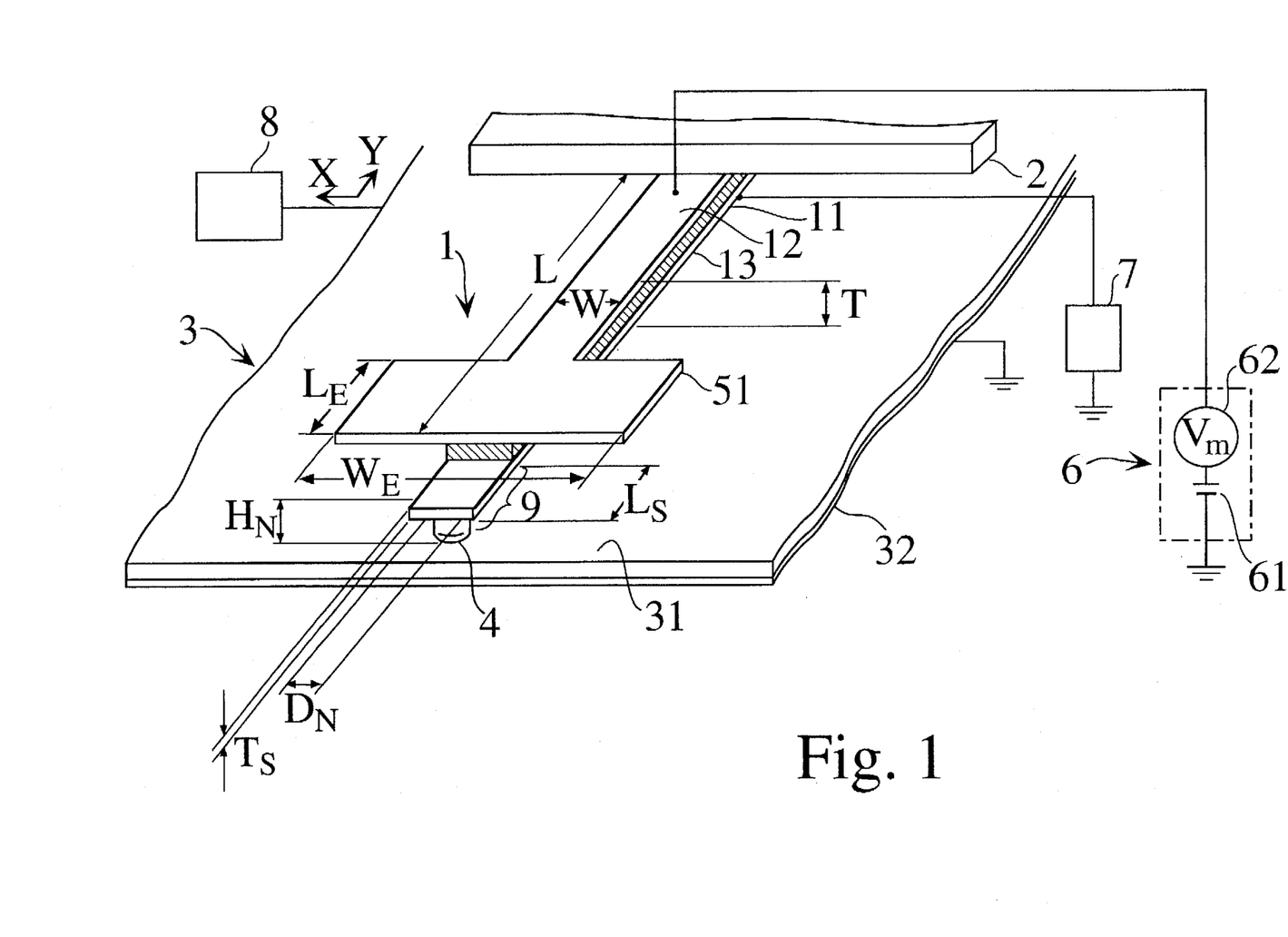
FIG. 1 is a perspective schematic diagram that shows a preferred embodiment of a probing device according to the invention.

The following describes the buffered/excited probing device herein disclosed, as applied to the read/write mechanism of a scanning memory device:

FIG. 1 shows one example of the structure of the buffered/excited probing device according to the invention. In FIG. 1, the cantilever-shaped probe 1 in the probe support substrate 2 is configured so as to project outwardly to the surface of the recording medium 3. The probe 1 becomes a three-layered structure consisting of conductive layers 12, 13 laminated to both sides of an insulating layer 11. A thin suspension member 9 is formed on the probe tip 1 where the top of the probe 1 is cut out. A micro-needle 4 is formed facing the recording medium on the side of the probe with the conductive layer 13 on the tip of the suspension member 9. A movable electrode 51 having a large area is formed on the side of the probe with conductive layer 12 on the tip of the probe 1 parallel to the surface of the recording medium 3.

The recording medium 3 becomes a two-layered structure of the recording layer 31 and the medium electrode 32. The recording layer 31 is positioned on the side of the medium facing the probe 1. The recording layer 31 is made from a dielectric material, and the medium electrode 32 is made from conductive material.

A probe control circuit 6 is connected between the movable electrode 51 and the medium layer 32. The probe control circuit 6 includes a series circuit consisting of a bias supply 61 and a modulation source 62. An electric circuit 7 for reading/writing is connected between the conductive layer 12 and the medium layer 32, i.e. between the micro-needle 4 and the medium electrode 32). In the embodiment of the invention shown in FIG. 1, the probe support substrate 2 does not move, and the recording medium 3 moves in the X-Y direction. This movement is performed by the probe scanning mechanism 8.

A specified voltage (modulation voltage $V_m$) is applied between the movable electrode 51 and the medium electrode 32 by the probe control circuit 6. The voltage $V_m$ is a periodic signal, such as a sequence of pulses. An electrostatic attractive force between the movable electrode 51 and the medium electrode 32 is generated with a constant period, i.e. oscillations having a specific frequency are applied to the movable electrode 51. The frequency of the signal generated by the modulation source 62 is determined by probe 1 structure, e.g. shape and material in each structural element. For example, the signal frequency can be matched to the resonance frequency of probe 1.

The suspension member 9 has a high characteristic resonance frequency with respect to the body of the probe 1. Consequently, the frequency of the signal applied by the probe control circuit 6 can be matched to this resonance frequency.

The buffered/excited probing device can be built using monolithic silicon lamination technology. In this embodiment, the length L of probe 1 is about 40 μm; the width W is about 4 μm; and the thickness T is about 0.3 μm. The length $L_E$ and width $W_E$ of the movable electrode are about 5 μm; the diameter $D_N$ and height $H_N$ of the micro-needle are each about 100 nm.

When the buffering effect caused by the suspension is small (e.g. for a short length suspension member 9 in FIG. 1), the effective inertial force of the probe tip increases because the effect of the body of the probe 1 is increased. In contrast, when the buffering effect caused by the suspension is large (e.g. for a long length suspension member 9 in FIG. 1), the probe 1 must be larger and problems may arise, such as a decrease in the mechanical strength of the suspension member. Taking this into consideration in this embodiment of the invention, the length $L_s$ of the suspension 9 is preferably about 2 μm and the thickness is preferably about 0.1 μm.

Figure 2:
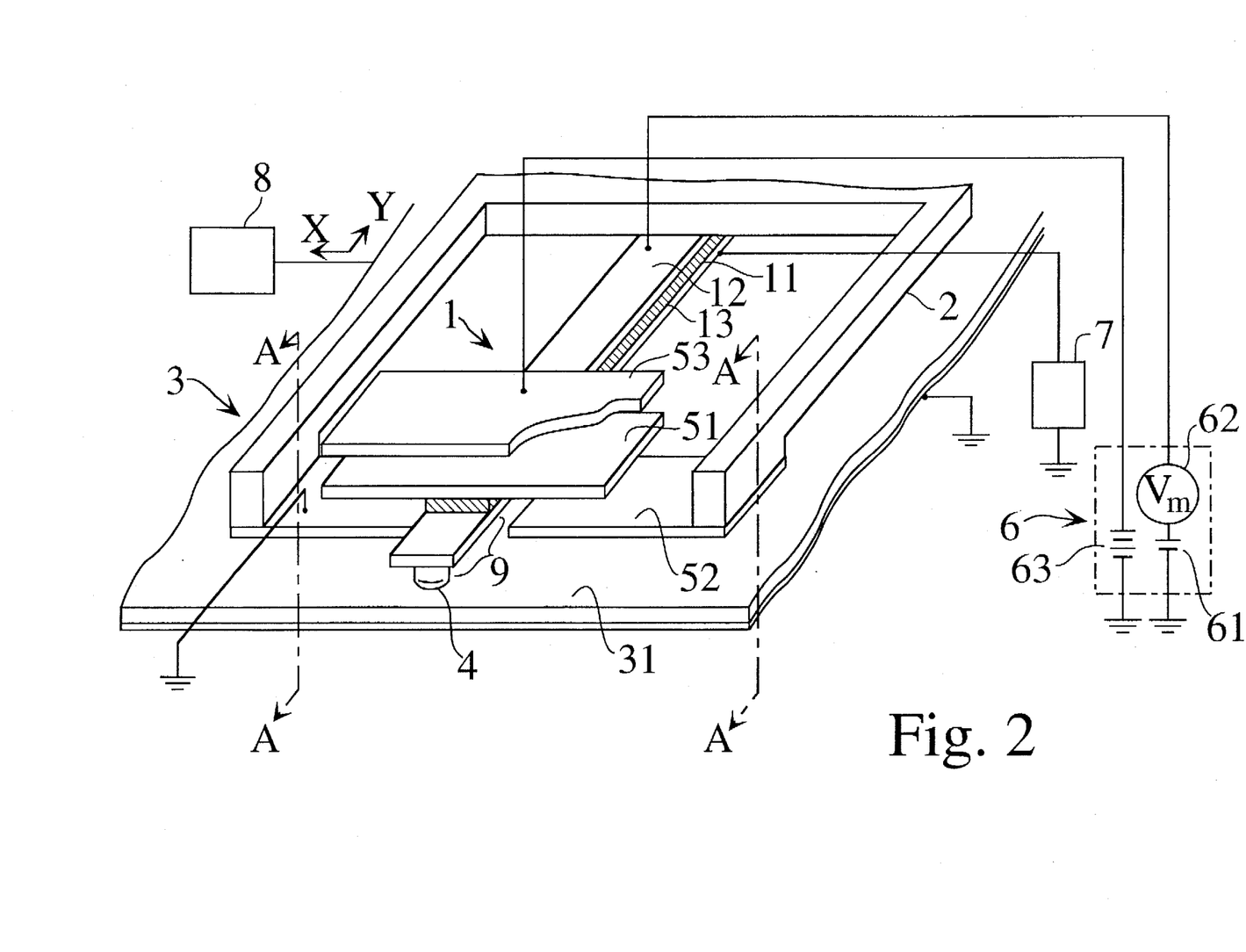
FIG. 2 is a perspective schematic diagram that shows an alternative, equally preferred embodiment of a probing device according to the invention.
Figure 3:
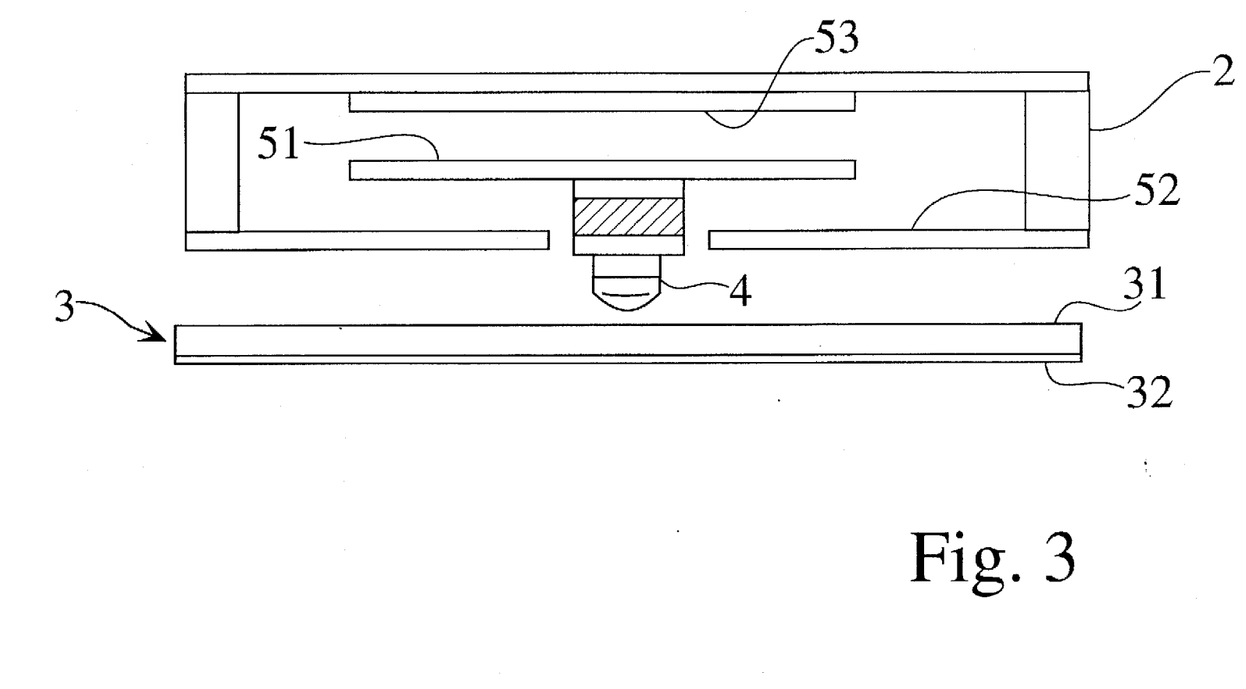
FIG. 3 is a cross-sectional view of the probe shown in FIG. 2 taken in the A—A direction.

FIG. 2 shows another structural example of the buffered/excited probing device. FIG. 3 is the cross-sectional view of the buffered/excited probing device of FIG. 2, taken in the A—A direction. In FIGS. 2 and 3, a pair of fixed electrodes 52, 53 and one movable electrode 51 are shown. In this respect, the probing device shown in FIG. 2 differs from the probing device shown in FIG. 1. By applying a periodic signal between the movable electrode 51 and the fixed electrode 52 or 53, oscillations are applied to probe 1.

The fixed electrode 53 is installed on top of the movable electrode 51 (side where the micro-needle 4 is not formed). The fixed electrode 52 is installed below the movable electrode 51 (side where micro-needle 4 is formed). A probe control circuit 6 is connected between the movable electrode 51 and the fixed electrodes 52, 53. A bias supply 63 is connected between the fixed electrodes 52 and 53. A DC circuit of the bias supply 61 generates a bias that is less than that of the bias supply 63. A modulation source 62 is connected between the movable electrode 51 and the fixed electrode 53.

In the probe 1, the movable electrode 51 can receive electrostatic force from the fixed electrodes 52 and 53. Accordingly, the movable electrode 51 can be controlled with high reliability. Also, the area of the movable electrode 51 can be smaller than that shown for the embodiment of FIG. 1.

In the buffered/excited probing device shown in FIG. 1, an electrode that corresponds to the fixed electrode 53 (shown in FIG. 2) can be installed on the probe 1 side. In this case, a probe control circuit 6 with the structure shown in FIG. 2 is used. In the buffered/excited probing circuit shown in FIG. 2, the fixed electrode 53 can be omitted. In this case, a probe control circuit 6 having the structure shown in FIG. 1 is used.

Figure 4:
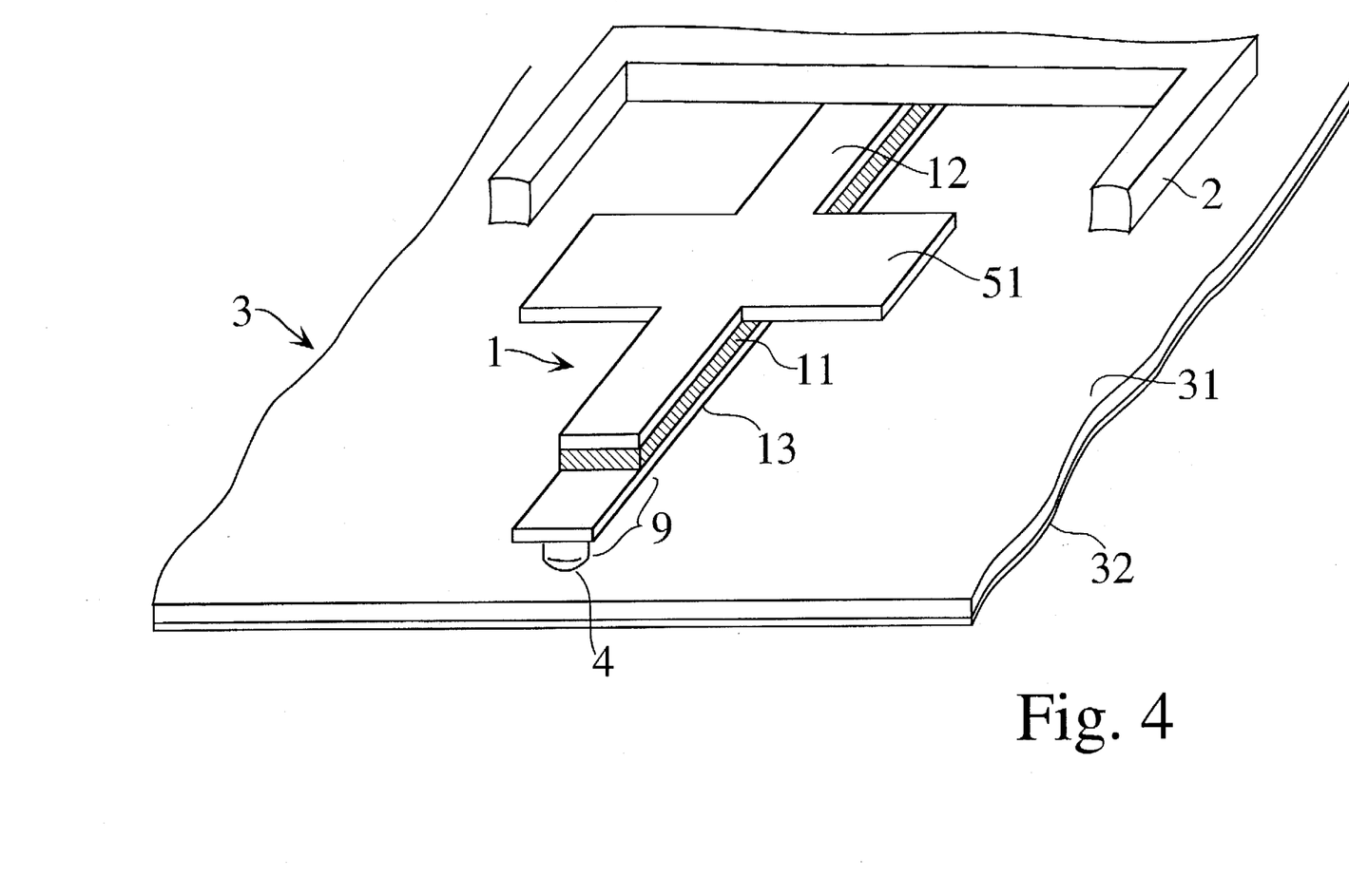
FIG. 4 is a perspective schematic diagram that shows another, equally preferred embodiment of a probing device according to the invention.

FIG. 4 shows another example structure of the buffered/excited probing device. The probing device shown in FIG. 4 has a movable electrode 51 installed in the center of the probe 1. In this embodiment, because the micro-needle 4 is separated from the movable electrode 51, the effective inertial force at the tip of the probe 1 is small compared to that of the structures shown in FIGS. 1 and 2.

Instead of the suspension member 9 shown in FIG. 1, a variety of suspension structures can be adopted in this embodiment of the invention. FIGS. 5(A) to 5(D) show other example structures for the suspension member.

Figure 5A:
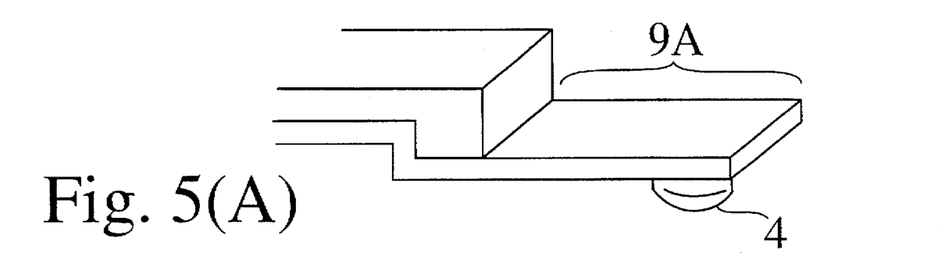
FIGS. 5(A) to 5(D) are perspective, schematic diagrams that show alternative suspension structures according to the invention.

The suspension member 9A shown in FIG. 5(A) is thinner than the body of the probe 1 and is installed to project downward. When various circuits are installed near the probe, as in a memory device, the advantage of this suspension member is that the distance between the micro-needle 4 and the body of the probe 1 increases.

Figure 5B:
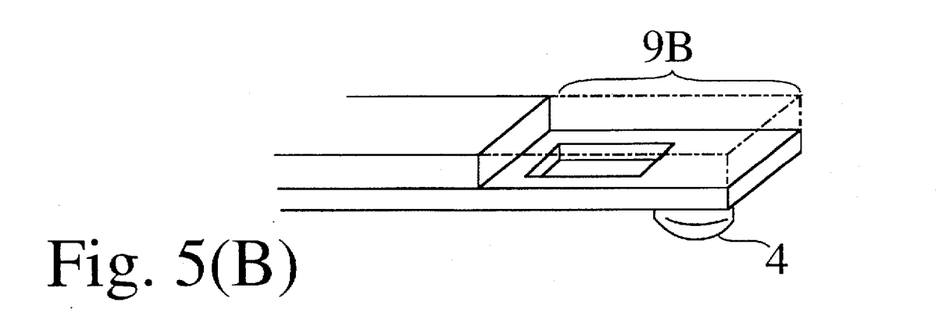

The suspension member 9B shown in FIG. 5(B) has a frame form from which the center part of the suspension member 9 shown in FIG. 1 has been removed. In FIG. 5(B), the suspension member 9B is thinner than the body of the probe 1, but can have the same thickness as the body of the probe 1, as shown by the dashed lines.

Figure 5C:
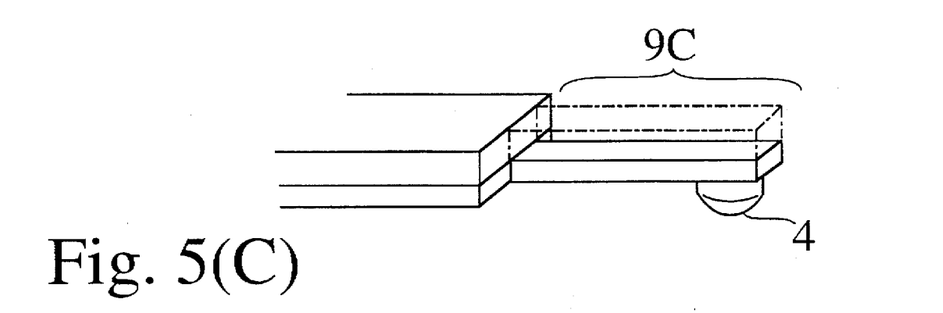

The suspension member 9C shown in FIG. 5(C) has a bar shape from which both sides of the suspension member 9 shown in FIG. 1 have been removed. In FIG. 5(C), the suspension member is thinner than the body of the probe 1, but can have the same thickness as the body of the probe 1, as shown by the dashed lines.

Figure 5D:
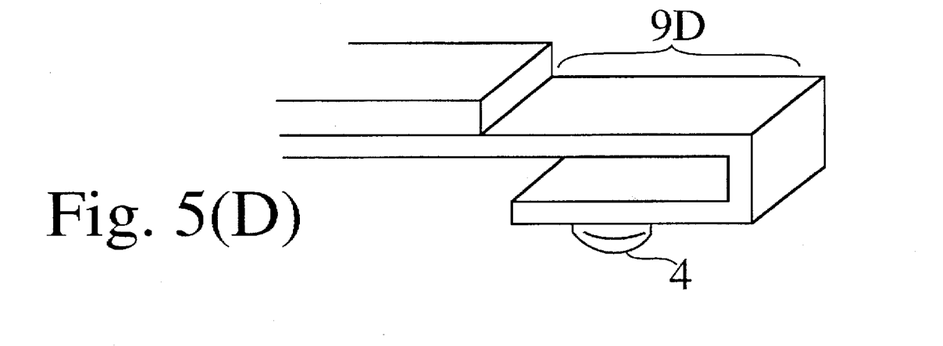

The suspension member 9D shown in FIG. 5(D) is formed as a plate that is thinner than the body of the probe 1 and is folded downward. In FIG. 5(D), a bend that corresponds to the force received from the recording medium can become large in a short length (i.e. the effective inertial force of the micro-needle 4 becomes small).

The following describes data reading and writing for a memory device having movable media that uses the buffered/excited probing device.

By driving the modulation source 62 of the probe control circuit 6, the probe 1 starts oscillating. Such oscillation quickly enters a steady state. The time until the oscillation moves to a steady state is determined by the lengths, thicknesses, widths, and materials of the probe 1 and suspension member 9. Usually, the time is very short. The oscillation center of the probe 1 is set to correspond to the supply voltage of the bias supply (numeric designator 61 in the probing device shown in FIG. 1; numeric designators 61 and 63 in the probing device shown in FIG. 2).

When the micro-needle 4 is in contact with the memory medium 3, the probe 1 oscillates and scans, as explained below with reference to FIGS. 6(A) to 6(D). In this embodiment, the memory medium 3 is moved rapidly with respect to the probe 1.

Figure 6A:
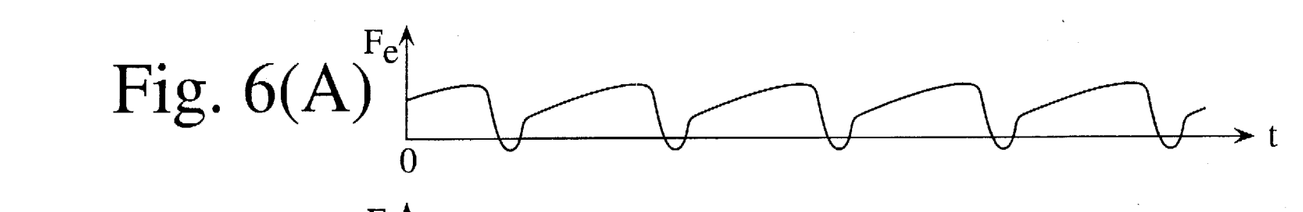
FIGS. 6(A) to 6(D) provide a series of diagrams that show one example of reading and writing with a probing device according to the invention.
Figure 6B:
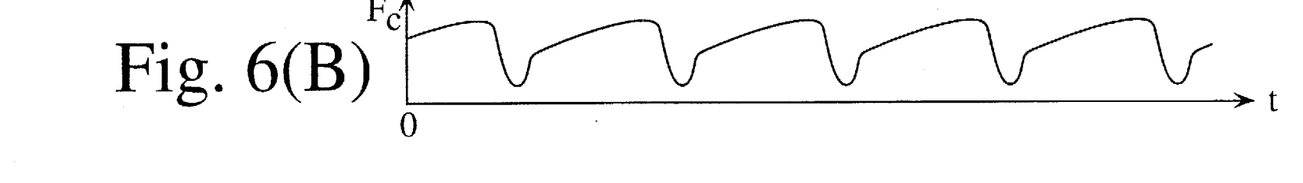

FIGS. 6(A) and 6(B) show the relationship between the force $F_e$ applied through probe 1 at the tip of the micro-needle 2 and the contact force $F_c$ at tip of the micro-needle 4 along the time axis (t). Force $F_e$ has the same characteristics as the signal waveform of the modulation source 62. Force $F_c$ is the vector sum of the resistance force that opposes external forces, adsorption force (intermolecular attractive force between the molecules at the tip of the micro-needle 4 and the molecules that form the recording medium), frictional force, and inertial force of the probe.

In the example shown here, force $F_e$ becomes less than zero in no more than one period. Even when a period where force $F_e$ is less than zero exists, the micro-needle is not separated from the recording medium 3. The magnitude of the contact force $F_c$ usually has a value greater than zero.

Figure 6C:
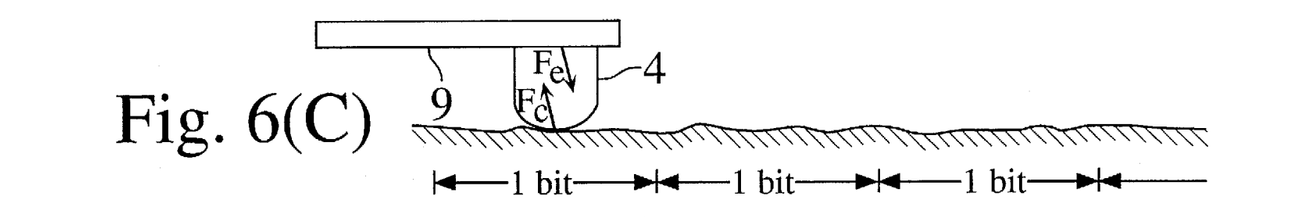
Figure 6D:
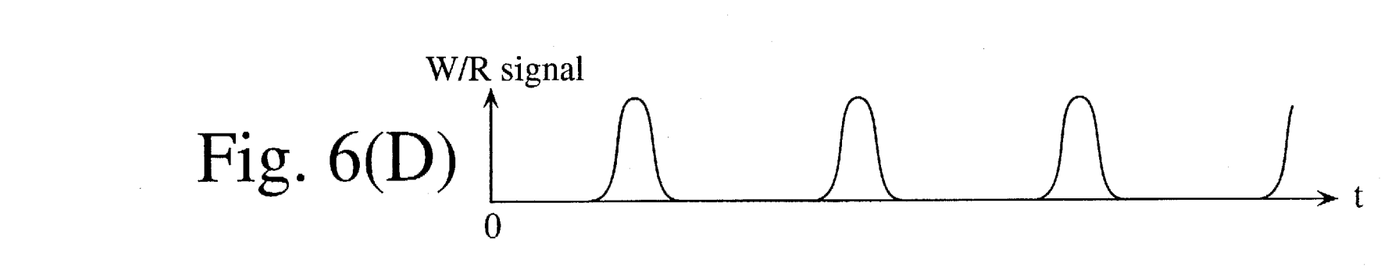

FIG. 6(C) shows the appearance of the surface of the recording medium 3 for the elapsed time and the micro-needle 4. Pulses are applied to the recording medium 3 by the electric circuit for reading and writing. FIG. 6(D) shows the pulses for reading and writing and corresponds to FIGS. 6(A) to 6(C). In this embodiment, the micro-needle 4 is always in contact with the surface of the recording medium. Therefore, read/write timing must not match the timing where the contact force $F_c$ reaches a maximum. The read/write period can be greater or less than the oscillation period of the probe 1. As shown in FIG. 6(D), the read/write period can be synchronized to the oscillation period of the probe.

In this embodiment, in particular, the suspension member 9 is placed between the probe 1 and the micro-needle 4. Because the suspension member 9 is subject to a significant amount of bending when the micro-needle 4 is in contact with the undulations on the surface of the recording medium 3, even for a small force, wear on the micro-needle 4 is eliminated or reduced.

With reference to FIGS. 7(A) to 7(D), the case where the micro-needle 4 is repeatedly in contact and not in contact with the medium 3 at a specified frequency is explained. Because FIGS. 7(A) to 7(D) are analogous to FIGS. 6(A) to 6(D), respectively, detailed explanations of the figures are omitted. The definitions of force $F_e$ and force $F_c$ in FIG. 7 are also the same as the definitions in FIG. 6 and are omitted.

Figure 7A:
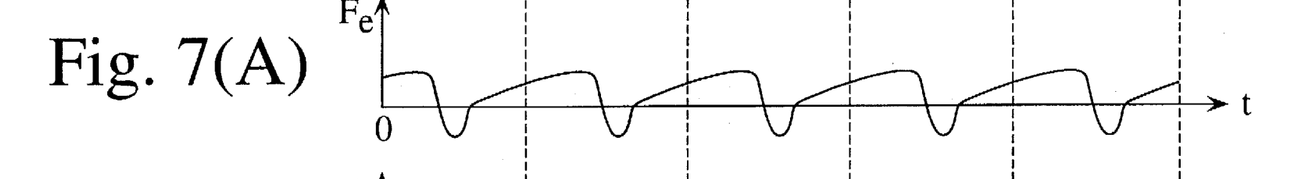
FIG. 7(A) to 7(D) provide a series of diagrams that show another example of reading and writing with a probing device according to the invention.
Figure 7B:
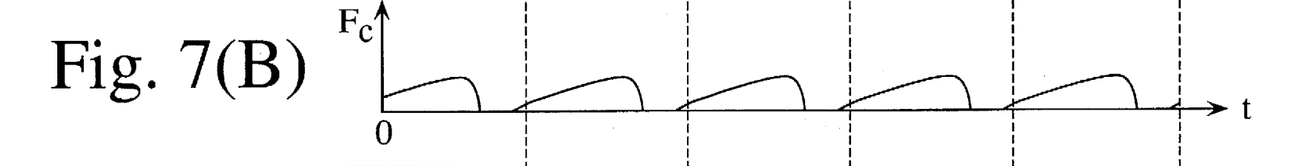
Figure 7C:
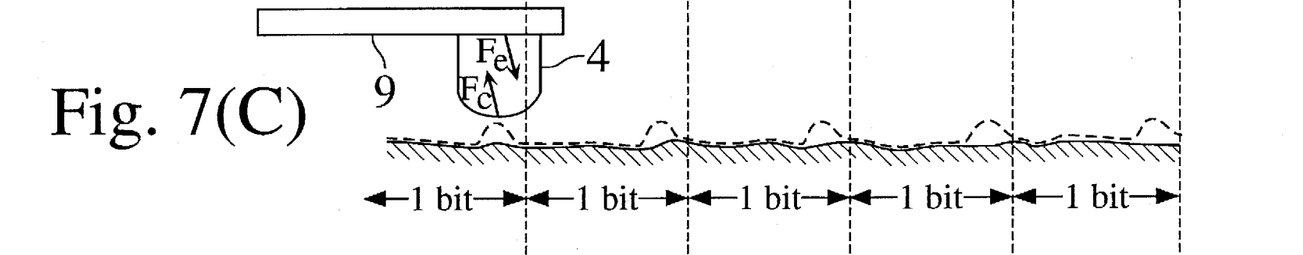

In this embodiment, as shown in FIG. 7(A), the period where force $F_e$ is less than zero is long. When the period where force $F_e$ is less than zero is long, the micro-needle separates from the recording medium. There is a period where the magnitude of the contact force $F_c$ becomes zero. For reference, the loci of the micro-needle 4 are written side by side in FIG. 7(C).

Figure 7D:
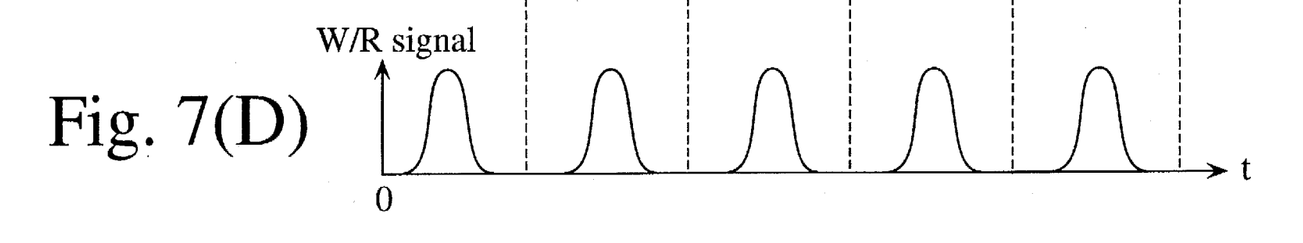

In this embodiment, when pulses for reading and writing the recording medium 3 are obtained from the electric circuit 7, the read/write timing as shown in FIG. 7(D) is synchronized to the timing where the contact force $F_c$ becomes a maximum.

In the probing apparatus herein disclosed, the read/write period can be greater than or less than the oscillation period of the probe 1. Because writing or reading is possible even during the period in which the micro-needle is not in contact with the recording medium, the read/write timing is not limited to the timing that is shown in FIG. 7(D). Furthermore, in the buffered/excited probing device the scanning speed (i.e. the moving speed of the memory medium) during normal use may be doubled and a mode for high-speed reading of data is possible.

In this embodiment, the suspension member 9 bends a great deal even for a small force. Thus, even when the micro-needle 4 is in contact with undulations on the surface of the recording medium 3, wear on the micro-needle 4 is eliminated or reduced.

Although a buffered/excited probing device is described above, a buffered probing device or an excited probing device can be used in the read/write mechanism of a scanning memory device.

When a buffered probing device is used in the read/write mechanism of a scanning memory device, reading or writing may be performed either with the micro-needle 4 is always in contact with the recording medium 3 or with the micro-needle never in contact with the recording medium. In the buffered probing device, oscillation cannot be applied to the probe 1. In this case, the modulation source is not installed in the probe control circuit.

When a read or write is performed where the micro-needle 4 is never in contact with the probe target, the distance between the micro-needle 4 and recording medium 3 is several angstroms (Å). When distance control is performed, the micro-needle 4 is occasionally in contact with the recording medium 3 because of a slow response. Wear on the micro-needle 4 is nonetheless eliminated or reduced by the invention.

When an excited probing device is used in the read/write mechanism of a scanning memory device, the suspension member 9 cannot be formed on the tip of the probe 1. Even when the suspension 9 is not formed on the tip of the probe 1, the mechanism of the excited probing device is similar to that of the buffered/excited probing device. When the frequency of the signal that generates the modulation source 62 matches the resonance frequency of the probe 1, the drive consumption current of the control circuit is small. To obtain the oscillation of the stable probe 1, applying a frequency that is less than the resonance frequency of the probe 1 is preferred.

Thus, wear on the micro-needle caused by contact with the micro-needle at the probe tip and the surface of the probe target is dramatically decreased. When the same wear is tolerated, undulations on the medium surface which are several times larger than usual are tolerated. Therefore, the probing device can be used as a read/write mechanism, and the wear life of the micro-needle is significantly extended. Furthermore, because the distance between the micro-needle and the surface of the probe target does not have to be detected, a more compact device can be designed, and its production cost can be decreased without making the peripheral circuits more complex.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

I claim:

1. A probing device, comprising:

a probe target having a surface;

a probe substrate, an elongate probe cantilevered from said probe substrate and terminating in a probe tip, said probe having a first spring constant per unit length in a direction perpendicular to said probe target;

a suspension member extending lengthways from said probe tip and having a second spring constant per unit length in said direction perpendicular to said probe target, said second spring constant per unit length being less than said first spring constant per unit length;

a micro-needle extending from said suspension member towards said surface of said probe target; and an electric circuit that applies electrical signals between said micro-needle and said probe target.

2. The probing device of claim 1, further comprising:

a probe scanning mechanism to move said probe relative to said surface of said probe target.

3. The probing device of claim 1, said probe target further comprising a recording medium from which data can be read and to which data can be written, wherein electrical signals are applied by said electric circuit between said micro-needle and said probe target to read said data to, or write said data from, said recording medium.

4. The probing device of claim 1, further comprising:

an excitation control circuit for causing said probe tip to oscillate at a specified frequency in a direction perpendicular to said probe target.

5. The probing device of claim 4, further comprising:

a probe scanning mechanism to move said probe relative to said surface of said probe target.

6. The probing device of claim 4, said probe target further comprising a recording medium from which data can be read and to which data can be written, wherein electrical signals are applied by said electric circuit between said micro-needle and said probe target to read said data to, or write said data from, said recording medium.

* * * * *